United States Patent [19]
Ganmukhi et al.

[11] Patent Number: 5,903,564
[45] Date of Patent: May 11, 1999

[54] EFFICIENT MULTICAST MAPPING IN A NETWORK SWITCH

[75] Inventors: Mahesh N. Ganmukhi, Carlisle; David J. White, Marlborough; Prasasth R. Palnati, Waltham, all of Mass.

[73] Assignee: Ascend Communications, Inc., Westford, Mass.

[21] Appl. No.: 08/919,840

[22] Filed: Aug. 28, 1997

[51] Int. Cl.$^6$ ............................... H04L 12/56; H04J 3/02
[52] U.S. Cl. ............................... 370/399; 370/390
[58] Field of Search ...................... 370/389, 390, 370/392, 395, 397, 399, 409, 413, 414, 412

[56] References Cited

U.S. PATENT DOCUMENTS

| | | | |
|---|---|---|---|
| 5,519,698 | 5/1996 | Lyles et al. | 370/414 |
| 5,546,385 | 8/1996 | Caspi et al. | 370/412 |
| 5,689,506 | 11/1997 | Chiussi et al. | 370/412 |

*Primary Examiner*—Chi H. Pham
*Assistant Examiner*—Maikhanh Tran

*Attorney, Agent, or Firm*—Weingarten, Schurgin, Gagnebin & Hayes LLP

[57] ABSTRACT

An apparatus and technique for facilitating mapping of a Multicast Circuit Identifier ("MID") to a Local Circuit Identifiers ("CID") is disclosed. Table entries for such mapping can be disposed in non-contiguous memory locations. A pointer is employed in ca h entry to indicate the location of any subsequent memory location associated with the MID. CIDs and associated memory locations are allocated only for ports that participate in a connection. To implement the apparatus and technique a first table provides an index into a second table based upon the MID. The second table includes entries having a port identification field, a pointer field and a CID field. The CID field indicates the CID associated with the port indicated by the port identification field. The CID is written to the header of the copy of the cell to be transmitted to the indicated port. The pointer indicates further entries in the second table that are associated with other copies of the cell to be transmitted in the multicast connection, if such entries exist. The CID is employed to obtain a Virtual Path Identifier ("VPI") and Virtual Circuit Identifier ("VCI") from a third table.

17 Claims, 2 Drawing Sheets

EFFICIENT MULTICAST MAPPING IN A NETWORK SWITCH

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is generally related to telecommunications switching, and more particularly to mapping of a multicast circuit identifier to at least one local circuit identifier in an Asynchronous Transfer Mode ("ATM") switch.

ATM switches typically include a plurality of ingress cards, each card having a plurality of ingress ports and supporting a plurality of connections or circuits, a plurality of egress cards having a plurality of egress ports, and a switch fabric disposed between the ingress and egress cards. ATM cells are received at an ingress card, transmitted through the switch fabric to an egress card, and then transmitted from the egress card to a point downstream from the switch. The switch fabric interconnects each ingress card with each egress card such that a cell received at any one of the ingress cards can be transmitted to any of the egress cards.

In multicast operation a single cell received at one ingress card is transmitted to a plurality of downstream connections. Such operation may require transmission from a plurality of egress cards. Further, each egress card may include a plurality of ports, and the multicast cell may be transmitted through any number of such ports.

Destination address information located in a header portion of the multicast cell is modified for each copy of the cell to be transmitted in a multicast connection. The incoming cell has a Virtual Path Identifier and Virtual Circuit Identifier ("VPI/VCI") which are operated upon to provide a Multicast Circuit Identifier ("MID") portion which is written to the cell header. Copies of the cell are then generated, and each cell copy is tagged at the egress card with a locally unique Circuit Identifier ("CID") portion that becomes part of the cell header. The CID provides identification of the egress circuit and egress port associated with the cell. In practice, each MID is mapped to multiple CIDs. The CID then functions as an index into a translation table that contains outgoing VPI/VCI fields that are written to the cell header to facilitate downstream routing of the cell.

Blocks of contiguous entries are allocated in a table in memory at the egress card to implement mapping for support of multicast transmission. In particular, one contiguous block of entries is allocated for each multicast connection, including allocation of one entry for each port in the egress card. The entries are contiguous for the full number of ports associated with the egress card. However, not all multicast connections utilize all of the ports in each designated egress card. Hence, memory space that is allocated to such ports is not being efficiently utilized. Further, modification of a unicast connection to a multicast connection is inhibited in the event that contiguous memory locations have been previously allocated to other connections.

BRIEF SUMMARY OF THE INVENTION

In accordance with the present invention, a pointer is employed to indicate the location of memory locations associated with a Multicast Circuit Identifier ("MID") entry for mapping the MID to a local Circuit Identifier ("CID"). The pointer enables entries to be located in non-contiguous memory locations in a mapping table. Further, CIDs and associated memory locations are allocated only for ports that participate in the connection.

To map a MID to a plurality of CIDs a first table provides an index into a second table based upon the MID. The second table includes entries having a port identification field, a pointer field and a CID field. The CID field indicates a CID associated with a port indicated by the port identification field. The CID is written to the header of the copy of the cell to be transmitted to the indicated port. The pointer indicates further entries in the second table that are associated with other copies of the cell to be transmitted in the multicast connection, if such entries exist. The CID is employed to obtain a Virtual Path Identifier ("VPI") and Virtual Circuit Identifier ("VCI") from a third table.

One advantage associated with the present invention is the facilitation of promoting a unicast connection to a multicast connection. When address translation entries associated with connections are required to be contiguous, the total number of ports which may be associated with a given connection is substantially fixed when the connection is established because memory space is typically allocated at addresses immediately above and below the connection. As such, a connection established as a unicast connection can not be promoted to a multicast connection unless memory locations contiguous with the initially established unicast connection are freed. The present invention overcomes this limitation by establishing multicast connections without the requirement for contiguous memory. Since contiguous memory is not required, a unicast connection can be promoted to a multicast connection without regard to the state of the memory locations that are contiguous with the initially established unicast connection. Efficiency is provided by allocating memory locations only for the ports that participate in the connection. Another advantage is that setting up a logical multicasting connection requires no special work. As more copies of a cell need to go out from a single port, new connections can be added on demand.

BRIEF DESCRIPTION OF THE DRAWING

The invention will be more fully understood in view of the following Detailed Description of the Invention, in conjunction with the Drawing, of which.

DETAILED DESCRIPTION OF THE INVENTION

Figure 1:
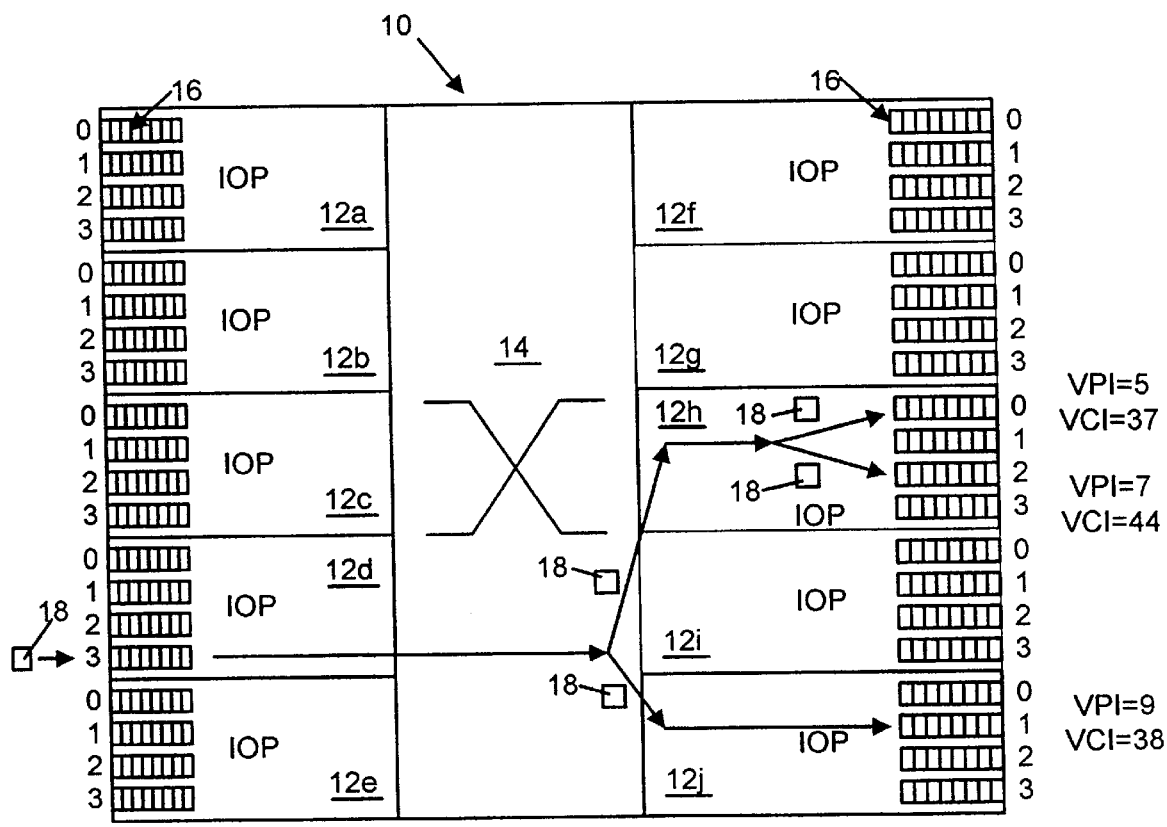
FIG. 1 is a block diagram of multicast transmission in an ATM switch.

Referring to FIG. 1, an Asynchronous Transfer Mode ("ATM") switch 10 includes a plurality of input-output ("IOP") cards 12a, 12b, 12c, 12d, 12e, 12f, 12g, 12h, 12i, 12j that are interconnected by a centrally located switch fabric 14. Each IOP card includes a plurality of ports 16. For the purposes of the present description IOP cards 12a–12e are ingress cards and IOP cards 12f–12j are egress cards, and each IOP card includes four ports numbered 0–3. It should be appreciated that ingress and egress functionality may be placed on a single card and that any number of ports may be employed.

In multicast operation an ATM cell 18 is received at a port 16 of an ingress IOP card and transmitted through the switch fabric 14 to a plurality of ports 16 on at least one egress IOP card. For example, the cell may be transmitted to a single egress port of a first IOP card and two egress ports of a second IOP card. Before each respective copy of the cell is transmitted from the switch, updated Virtual Path Identifier ("VPI") and Virtual Circuit Identifier ("VCI") fields are written to header portions of the copies of the multicast cell to facilitate downstream routing.

Figure 2:
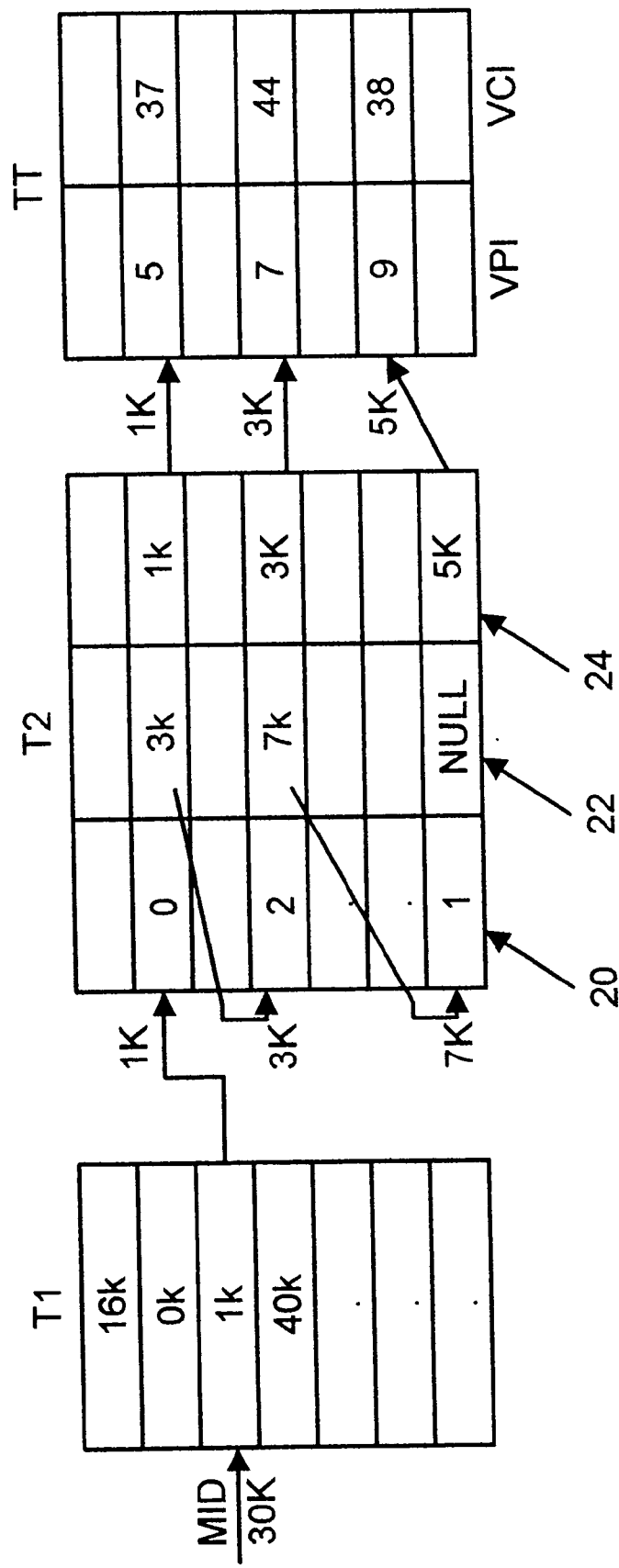
FIG. 2 is a block diagram of MID to CID mapping on the egress card in an ATM switch.

Referring to FIG. 2, two tables are employed to map a Multicast Circuit Identifier ("MID") associated with the incoming cell to respective Local Circuit Identifiers ("CIDs") to facilitate assignment of the VPI and VCI fields to copies of the multicast cell using a third table. The multicast ATM cell is assigned a MID upon entering the switch by means known in the art. The MID is then employed as an index into a first table T1, in which one entry per MID is maintained. The corresponding entry in table T1 is then employed as an index into a second table T2, in which one entry per CID is maintained. In particular, table T2 includes a linked list of CIDs that are allocated for the MID associated with the multicast cell. Each entry in table T2 contains an outgoing port number indicator 20, a pointer 22 back into table T2, and an index 24 into a Translation Table TT. The index may be a CID. The corresponding entry in table TT contains the outgoing VPI/VCI to be assigned to the respective copy of the ATM cell. Since each entry in table T2 includes a pointer to another entry in table T2, it is not necessary to allocate contiguous blocks for the translation operation. Further, CIDs need not be allocated for ports that do not participate in a connection, thereby providing for more efficient use of available memory resources.

Referring to FIGS. 1 and 2, in an illustrative example the ATM cell 18 enters the switch at IOP card 12d at port 3 with a VPI=4 and VCI=10. The VPI/VCI are employed to perform an ingress address translation that results in an MID of 30K (MID numbers are arbitrarily generated during switch initialization), which is written to the cell header. The MID identifies the cell as a multicast cell, and consequently the MID is employed as an index into table T1. The corresponding entry in table T1 at address 30K, which is 1K (locations of entries in tables T1, T2 and TT are arbitrarily assigned as connections are initialized), is then employed as an index into table T2. The entry at address 1K in table T2 indicates port 0, a pointer to address 3K and a CID of 1K. The CID is then employed as an index into table TT to obtain VPI=5, VCI=37 at address 1K. The VPI/VCI address that is obtained is written to the header of the copy of the multicast cell to be transmitted out of port 0 of IOP card 12h. The pointer 22 to address 3K is then employed to obtain information for the next copy of the multicast cell. In particular, the entry at address 3K of table T2 indicates port 2, a pointer 22 to address 7K and a CID of 3K. The CID is employed as an index into table TT to obtain VPI=7, VCI=44 at address 3K. The VPI/VCI thus obtained is written to the header of the copy of the multicast cell to be transmitted out of port 2 of IOP card 12h. The pointer 22 to address 7K is then employed to obtain information for the next copy of the multicast cell. In particular, the entry at address 7K of table T2 indicates port 1, a null value for pointer 22 and a CID of 5K. The CID is then employed as an index into table TT to obtain VPI=9, VCI=38 at address 5K. The VPI/VCI thus obtained is written to the header of the copy of the multicast cell to be transmitted out of port 1 of IOP card 12j. The null pointer indicates that no more copies of the multicast cell are to be transmitted.

The mapping technique facilitates promotion of a unicast connection to a multicast connection. When address translation entries associated with connections are required to be contiguous, the total number of ports that are associated with a given connection is substantially fixed when the connection is established because memory space is typically allocated at the addresses immediately above and below the connection. As such, a connection that is established as a unicast connection cannot be easily modified to a multicast connection unless the memory locations contiguous with the initially established unicast connection become available. However, since the presently disclosed mapping technique employs pointers that may address any address within table T2, contiguous memory is not required and a unicast connection can be changed to a multicast connection without regard to the state of allocation of the memory locations that are contiguous with the initially established unicast connection.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. A method for mapping a first identifier associated with a data unit to a second identifier associated with the data unit in a telecommunications switch having a plurality of ports, comprising the steps of:

assigning one entry per first identifier in a first memory table;

assigning one entry per second identifier in a second memory table;

writing, in at least one entry in the first table, a pointer to an entry in the second table;

writing, in at least one entry in the second table, a second identifier and a pointer to an entry in the second table;

employing the first identifier as an index into the first table to obtain a corresponding pointer from the first table;

employing the pointer obtained from the first table as an index into the second table to obtain a corresponding second identifier and pointer from the second table;

associating the second identifier obtained from the second table with the data unit; and employing the pointer obtained from the second table to determine whether any further entry in the second table is applicable to the data unit.

2. The method of claim 1, wherein a further entry in the second table is determined to be applicable to the data unit, and including the further step of employing the pointer obtained from the second table as an index into the second table to obtain an additional corresponding second identifier and an additional pointer from the second table.

3. The method of claim 2 including the further step of associating the additional second identifier obtained from the second table with a copy of the data unit.

4. The method of claim 1 including the further step of writing a port identifier in each entry in the second table.

5. The method of claim 4 including the further step of transmitting the data unit through the port indicated by the port identifier.

6. The method of claim 1 wherein the switch includes a third memory table and including the further step of assigning one entry per second identifier in the third table.

7. The method of claim 6 including the further step of writing, in each entry in the third table, a Virtual Path Identifier and a Virtual Circuit Identifier.

8. The method of claim 7 including the further step of employing the second identifier obtained from the second table as an index into the third table to obtain a corresponding Virtual Path Identifier and Virtual Circuit Identifier from the third table, and associating the Virtual Path Identifier and Virtual Circuit Identifier obtained from the third table with the data unit.

9. Apparatus for mapping a first identifier associated with a data unit to a second identifier associated with the data unit in a telecommunications switch having a plurality of ports, comprising:

a first table having one entry per first identifier; and a second table having one entry per second identifier;

said first table including a pointer to an entry in the second table in at least one entry and said second table including a second identifier and a pointer to an entry in the second table in at least one entry, wherein the first identifier is employed as an index into the first table to obtain a corresponding pointer from the first table, and the pointer obtained from the first table is employed as an index into the second table to obtain a corresponding second identifier and pointer from the second table, the second identifier obtained from the second table being associated with the data unit and the pointer obtained from the second table being employed to determine whether any further entry in the second table is applicable to the data unit.

10. The apparatus of claim 9 wherein, when a further entry in the second table is determined to be applicable to the data unit, the pointer obtained from the second table is employed as an index into the second table to obtain-?n an additional corresponding second identifier and an additional pointer from the second table.

11. The apparatus of claim 10 wherein, the additional second identifier obtained from the second table is associated with a copy of the data unit.

12. The apparatus of claim 9 wherein each entry in the second table includes a port identifier.

13. The apparatus of claim 12 wherein the data unit is transmitted through the port indicated by the port identifier.

14. The apparatus of claim 9 further including a third memory table having one entry per second identifier.

15. The apparatus of claim 14 wherein a Virtual Path Identifier and a Virtual Circuit Identifier are written in each entry in the third table.

16. The apparatus of claim 15 wherein the second identifier obtained from the second table is employed as an index into the third table to obtain a corresponding Virtual Path Identifier and Virtual Circuit Identifier from the third table, and the Virtual Path Identifier and Virtual Circuit Identifier obtained from the third table are associated with the data unit.

17. A method for mapping a first Virtual Path Identifier and a first Virtual Circuit Identifier associated with an Asynchronous Transfer Mode cell to a second Virtual Path Identifier and a second Virtual Circuit Identifier in an Asynchronous Transfer Mode switch a plurality of ports, comprising the steps of:

employing the first Virtual Path Identifier and first Virtual Circuit Identifier to provide a Multicast Circuit Identifier;

assigning one entry per Multicast Circuit Identifier in a first table;

assigning one entry in a second table for each copy of the multicast cell to be transmitted;

assigning one entry in a third table for each entry in the second table;

writing, in at least one entry in the first table, a pointer to an entry in the second table;

writing, in at least one entry in the second table, a port identifier, a Connection Identifier and a pointer to an entry in the second table;

writing, in at least one entry in the third table, the second Virtual Path Identifier and the second Virtual Circuit Identifier;

employing the Multicast Circuit Identifier as an index into the first table to obtain a corresponding pointer from the first table;

employing the pointer obtained from the first table as an index into the second table to obtain a corresponding output port, Connection Identifier, and pointer from the second table;

associating the Connection Identifier obtained from the second table with the cell;

employing the Connection Identifier as an index into the third table to obtain the second Virtual Path Identifier and second Virtual Circuit Identifier;

associating the second Virtual Path Identifier and the second Virtual Circuit Identifier with the cell;

transmitting the cell through the output port indicated by the port identifier obtained from the second table; and employing the pointer obtained from the second table to determine whether any further entry in the second table is applicable to the cell.

* * * * *